United States Patent [19]

Zombolas

[11] Patent Number: 4,737,956
[45] Date of Patent: Apr. 12, 1988

[54] APPARATUS FOR DETECTING FAILURES IN DATA PATH CONTROL LINE COPIES

[75] Inventor: Gary L. Zombolas, Santa Clara, Calif.

[73] Assignee: Amdahl Corporation, Sunnyvale, Calif.

[21] Appl. No.: 895,250

[22] Filed: Aug. 11, 1986

[51] Int. Cl.[4] ............................................. G06F 11/10
[52] U.S. Cl. ...................................................... 371/49
[58] Field of Search ........................... 371/49, 50, 51; 364/200, 900

[56] References Cited

U.S. PATENT DOCUMENTS

| | | | |
|---|---|---|---|
| 3,075,175 | 1/1963 | Lourie | 371/50 |
| 3,882,460 | 5/1975 | Bennet, Jr. | 371/49 |
| 4,262,358 | 4/1981 | Marino, Jr. | 371/51 |
| 4,453,251 | 6/1984 | Osman | 371/51 |
| 4,580,265 | 4/1986 | Gooding et al. | 371/49 |

Primary Examiner—Charles E. Atkinson
Attorney, Agent, or Firm—Fliesler, Dubb, Meyer & Lovejoy

[57] ABSTRACT

In a data processing machine having a parity checked data path n bits wide, the n bits including a plurality of groups of bits each having at least one data bit and at least one parity bit for the group, and having enabling gates connected to receive the n bits and responsive to a control signal to supply the n bits to the data path, and further including parity checkers for detecting parity errors in the respective groups, the present invention provides an improvement for supplying copies of the control signal to the enabling gates so that the data path parity checkers will detect errors in the control signal copies. The improvement comprises a plurality of power gates connected to receive the control signal at respective inputs and connected to supply respective copies of the control signal to at least one enabling gate supplying a bit in a first of the groups and to at least one enabling gate supplying a bit in a second of the groups.

4 Claims, 2 Drawing Sheets

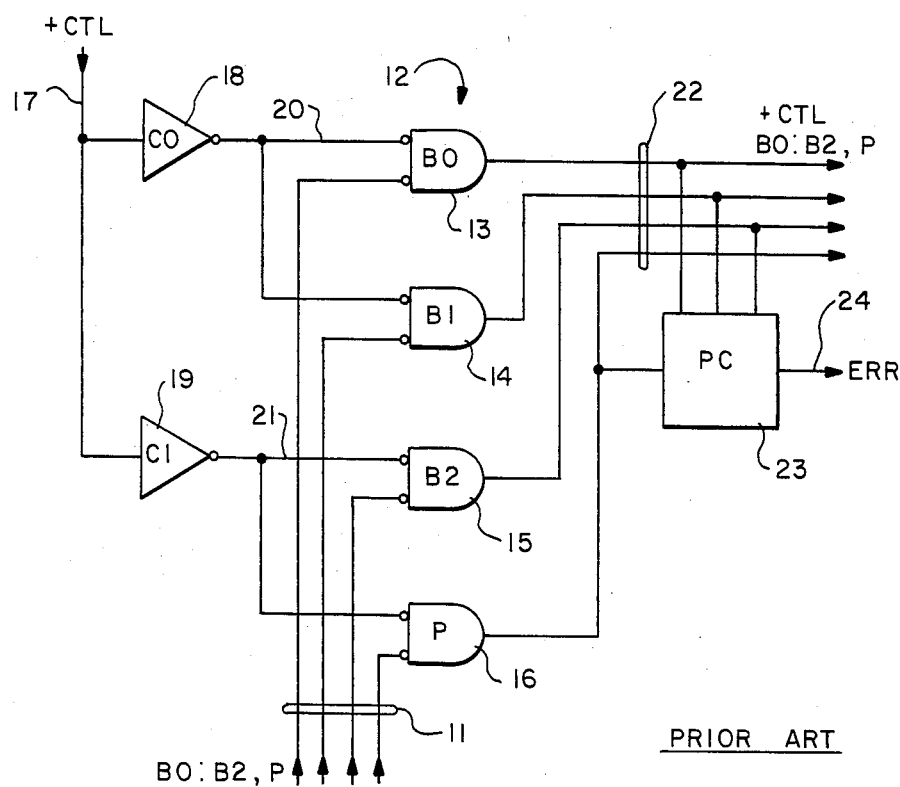
FIG.—1  PRIOR ART
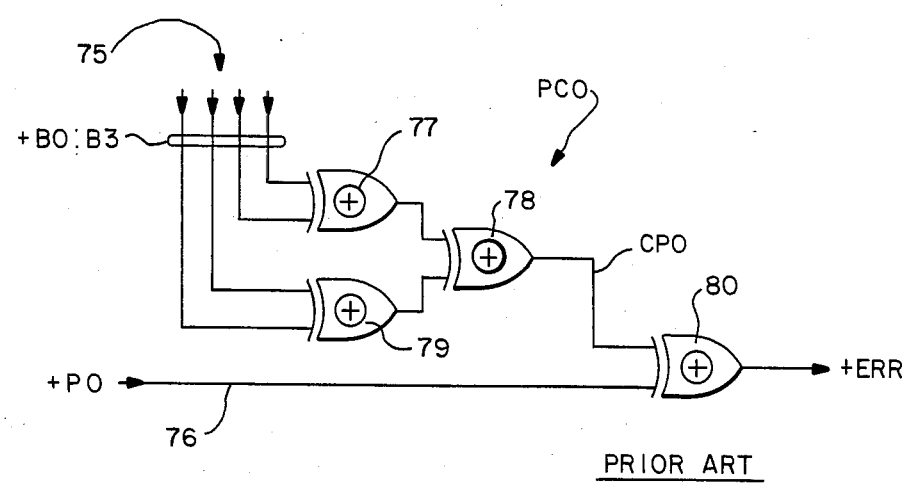
FIG.—3  PRIOR ART

APPARATUS FOR DETECTING FAILURES IN DATA PATH CONTROL LINE COPIES

FIELD OF THE INVENTION

The present invention relates to data processing apparatus which include a parity checked data path that is enabled or disabled by a control signal. In particular, the invention relates to systems in which plural copies of the control signal are generated to enable multiple lines of a data path.

BACKGROUND OF THE INVENTION

Data processing machines typically include numerous data paths across which data are transmitted between sections of the machine. The data transmitted between sections of the machine. The data transmitted across the data paths are often partitioned into groups of bits, such as words containing 16 bits each, bytes containing 8 bits each, or digits containing 4 bits each.

In order to detect errors occurring within the groups of bits, a parity bit or other error code is associated with individual groups of bits being transmitted on the data path.

Thus, a data path will transmit a field of bits of data which are partitioned into groups. Associated with each group in the field, a parity bit is also supplied across the data path.

The data paths are enabled in response to a control signal. Typically, each individual line is enabled by an enabling gate which receives a copy of the control signal. Because of the large number of enabling gates required for some data paths, multiple copies of the control signal are fanned out by control signal power gates.

Prior art systems have been unable to detect errors occurring in these control signal power gates. Thus, it is possible for an error in a control signal power gate to go undetected in the machine, leading to unacceptable machine performance.

FIG. 1 illustrates a prior art system for enabling a data path.

The data path includes a field 11 of bits B0:B2, P which include a group of bits B0-B2 and a parity bit associated with the group. Only one group of bits is shown in the embodiment of FIG. 1 in order to simplify the description. It should be appreciated that multiple groups of bits with associated parity bits could be implemented. The field 11 of bits in the data path are supplied individually to data path enabling gates 12. Thus, bit zero B0 is supplied as one input to gate 13, bit one B1 is supplied as one input to gate 14, bit two B2 is supplied as one input to gate 15 and the parity bit P is supplied as one input to gate 16. The second input of the enabling gates 12 is a copy of the control signal CTL. The control signal CTL is supplied on line 17 to power gate 18 for copy zero C0 and power gate 19 for copy one C1 of the control signal. Power gates 18 and 19 supply an inverted version of the control signal on lines 20 and 21, respectively. Line 20 supplies one input to gate 13 and one input to gate 14. Line 21 supplies one input to gate 15 and one input to gate 16. Thus each power gate supplies a respective copy C0, C1 of the control signal CTL to two enabling gates within the field 11.

The inputs to the enabling gates are inverted, as indicated by small circles in the figure, in order to account for the inverting effect of the power gates 18 and 19.

When the control signal CTL is asserted, the enabling gates 12 supply the field 11 including bits B0-B2 and the parity bit P to the data path 22. A parity checker 23 receives the parity bit P from gate 16, and bits B0-B2 from gates 13-15. If the parity check detects an error, then an error signal is supplied on line 24.

The embodiment shown in FIG. 1, however, is unable to detect in all cases a failure in one of the control signal copies from power gates 18 or 19. In this particular embodiment, a 25% probability of not detecting a damaging failure in one of the control line copies exists. If one of the power gates 18, 19 fails, then there is a 25% probability that the outputs of the respective enabling gates will produce a benign failure and a 50% probability that they will produce a detectable error. For instance, if the output of power gate 18 is erroneously asserted, then enabling gates 13 and 14 will supply bits B0 and B1 in the form supplied at the input field 11. Since the output of the power gate 18 should not be asserted, the outputs of the gates 13 and 14 should be both zero. For example, in an even parity machine there is a 25% chance of a benign failure because one of the four possible states of bits B0 and B1 is the desired value of 00. Two of the possible states of bits B0 and B1 are 01 and 10. If these values are supplied on the data path 22, then the parity checker 23 will detect an error because of the single bit deviation from the preferred value of 00. Thus, there is a 50% chance of a detected error. However, if bits B0 and B1 supply values 11 to the data path 22, then the parity checker 23 will not detect the error. Therefore, a 25% chance exists of an actual damaging error occurring that goes undetected by the parity checker 23 due to the failure of the power gate 18.

Thus, as can be seen in FIG. 1, there always exists a probability that an error occurring in a power gate 18, 19 will go undetected. The following discussion provides a generalized description of the probability of detecting a failure in a control line copy using data path parity checkers, such as the parity checker 23 shown in FIG. 1.

If a control line copy affects n bits of an m bit wide parity checked field (where m includes both the data and parity bits), the following can be stated about the probability of detecting a failure in the control line copy:

(a) If n=m
  (i) Erroneously Asserted Output of Power Gate
  For this case, the affected enabling gates should produce all 0's but instead transfer to their outputs the values of their inputs.
  One failure mode is benign (b) when the actual outputs are all 0's. All other failure modes go undetected since the data and parity at the inputs of the affected enabling gates are passed unaltered to the outputs.
  (ii) Erronously Not Asserted Output of Power Gate
  For this case, the affected enabling gates should transfer to their outputs the values of their inputs but instead produce all 0's.
  One failure mode is benign (b) when the should be outputs are all 0's. All other failure modes go undetected since the affected enabling gates generate all 0's (i.e. 0 data with good parity).
  (iii) Probabilities
  $p(b) = 2 \text{ in } 2 * 2^m = 2^{(-m)}$
  $p(d) = 0 \text{ in } 2 * 2^m = 0$
  $p(u) = 1 - (p(b) + p(u)) = 1 - 2^{(-m)}$
(b) If n≠m, (i) Erroneously Asserted Output of Power Gate For this case, the affected enabling gates should produce all 0's but instead transfer to their outputs the values of their inputs.

(1) Half of the failure modes are detected failures since half of the possible $2^n$ actual output values from the affected enabling gates produce parity errors when combined with the all 0's outputs of the m-n unaffected enabling gates. This statement is based on the fact that for an n bit number, $2^{(n-1)}$ of the possible values have even parity and $2^{(n-1)}$ have odd parity. When combined with the even parity of the unaffected enabling gate output values, the affected enabling gate actual output values which have odd parity produce parity errors. Likewise, the affected actual output values which have even parity produce no parity errors.

(2) Of the remaining $2^{(n-1)}$ failure modes which are undetected failures, 1 mode is benign when the actual output values of the affected enabling gates are all 0's. All other modes are undetected, damaging failures.

(ii) Erroneously Not Asserted Output of Power Gate

For this case, the affected enabling gates should transfer to their outputs the values of their inputs but instead produce all 0's.

(1) Half of the failure modes are detected failures since half of the possible $2^n$ should be output values from the affected enabling gates have parities opposite the all 0's parity actually produced by the enabling gates. This statement is based on the fact that for an n bit number, $2^{(n-1)}$ of the possible values have even parity and $2^{(n-1)}$ have odd parity. When the all 0's, even parity of the affected enabling gate actual output values is combined with the parity of the unaffected enabling gates output values, the affected should be output values which have odd parity result in parity errors. Likewise, the affected should be output values which have even parity result in no parity errors.

(2) Of the remaining $2^{(n-1)}$ failure modes which are undetected failures, 1 mode is benign when the should be output values of the affected enabling gates are all 0's. All other modes are undetected, damaging failures.

(iii) Probabilities $p(b) = 2$ in $2 * 2^n = 2^{(-n)}$
$p(d) = 2 * 2^{(n-1)}$ in $2 * 2^n = 0.5$
$p(u) = 1 - (p(b) + p(u)) = 0.5 - 2^{(-n)}$ As can be seen from the foregoing discussion, as a power gate affects an increasing number of bits in a single parity checked field, the probability of an undetected, damaging failure increases due to the occurrence of an error in a power gate. Thus, there is a need for a mechanism that will reduce the probability of an undetected damaging error due to a failure in a power gate.

SUMMARY OF THE INVENTION

The present invention improves the probability that an error in a power gate for a data path will be detected by the data path parity checkers.

For data processing machines that provide a data field having more than one error checked group of information units, the respective groups including data and error codes for identifying errors in the data of the respective groups, the present invention provides an apparatus responsive to a control signal for supplying the data field to a data path that improves over the prior art. The data path includes a plurality of parallel data lines, one data line for each information unit in the data field, and for each respective error checked group a means connected to the data lines in the data path corresponding to the respective group and responsive to the data and error code of the respective group for detecting errors in the respective group. The invention comprises means for generating plural copies of the control signal in order to supply sufficient power for driving several gates enabling the lines in the data path. Further, for each data line, an enabling gate receiving one of the information units from a group of the data field at one input and one of the plural copies of the control signal at another input, for supplying the one information unit to the corresponding data line, is provided. Finally, a means for coupling each of the plural copies of the control signal, respectively, to one enabling gate for supplying an information unit from one of the error checked groups to the corresponding data line and to another enabling gate for supplying an information unit from another of the error checked groups to the corresponding data line is included, whereby an error in one copy of the control signal affects information units supplied to the data path from more than one error checked group in the data field.

In a preferred aspect of the invention, the information units are binary bits that are checked by parity. Therefore, according to the present invention, each copy of the control signal supplied by a power gate affects bits in the data path that are checked by more than one parity checker. Since the parity for at least two of the bits in the data path powered by a single power gate are independently checked for parity, the probability of not detecting a damaging failure in one of the copies of the control signal is decreased.

BRIEF DESCRIPTION OF THE DRAWINGS

FIG. 1 illustrates a prior art embodiment of a data path enabling system.

FIG. 3 illustrates an embodiment of a parity checker such as is used in the embodiment shown in FIG. 2 of the present invention.

DETAILED DESCRIPTION OF THE INVENTION

Figure 2:
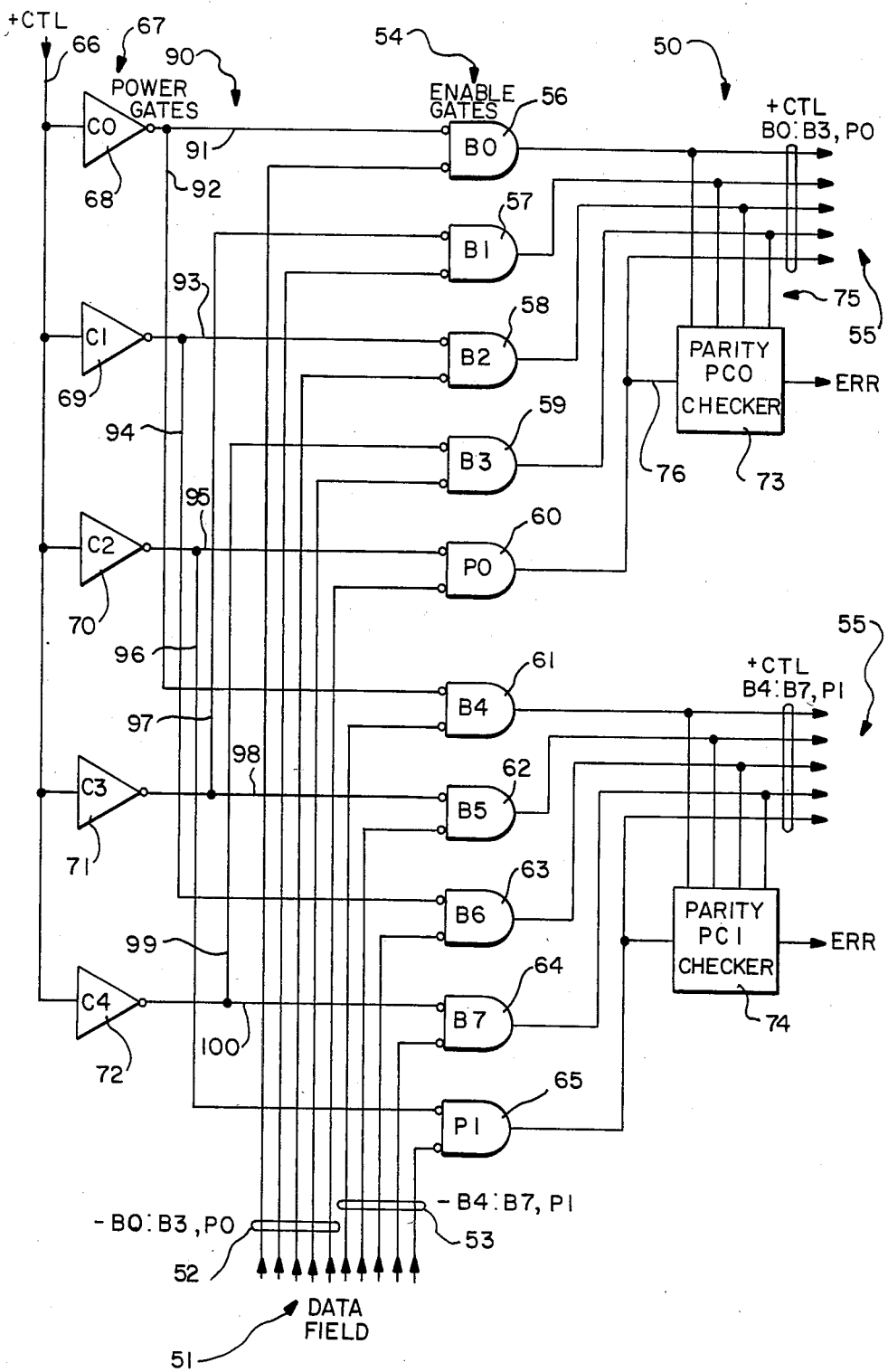
FIG. 2 illustrates a preferred embodiment of the present invention.

With reference to the figures, a detailed description of the preferred embodiment is provided.

FIG. 2 illustrates a preferred embodiment of a parity checked data path designated generally at 50 according to the present invention. A field of bits 51 is supplied to the parity checked data path 50. The field 51 of data includes a plurality of groups. There are two groups in the example shown. In FIG. 2, the first group 52 includes data bits B0-B3 and a parity bit P0 associated with the first group 52. The second group 53 includes data bits B4-B7 and a parity bit P1 associated with the second group 53. While the preferred embodiment is based on binary bits that are checked by parity, information units other than binary bits and error checking codes other than parity can be used to meet the need of various data processing systems.

The field 51 is supplied to a means 54 for enabling the parity checked data path 50 to supply the field 51 over output lines 55. The means 54 for enabling the parity checked data path include an enabling gate for each respective bit in the field 51. Thus, enabling gate 56 receives as one input bit zero B0, enabling gate 57 receives as one input bit one B1, enabling gate 58 receives as one input bit two B2, enabling gate 59 receives as one input bit three B3, and enabling gate 60 receives as one input parity bit P0 for the first field 52. Likewise, enabling gate 61 receives as one input bit four B4, enabling gate 62 receives as one input bit five B5, enabling gate 63 receives as one input bit six B6, enabling gate 64 receives as one input bit seven B7 and enabling gate 65 receives as one input a parity bit P1 of the second group 53.

Each of the respective enabling gates 56-65 receives as its second input a copy of a control signal CTL supplied over line 66. A means 67 is included for generating plural copies of the control signal CTL. The means 67 includes a power gate 68 generating copy zero C0 of the control signal, power gate 69 generating copy one C1 of the control signal, power gate 70 generating copy two C2 of the control signal, power gate 71 generating copy three C3 of the control signal and power gate 72 generating copy four C4 of the control signal.

Each of the power gates 68-72 generates a copy of the control signal having sufficient power to drive more than one enabling gate. However, limitations of gate power prevent the use of a single power gate for large data paths.

A means, shown generally at 90, is provided for coupling each of the plural copies of the control signal C0-C4, respectively, to one enabling gate for supplying a bit from one of the error checked groups to the corresponding data line and to another enabling gate for supplying a bit from another of the error checked groups, whereby an error in one copy of the control signal affects bits supplied to the data path from more than one error checked group.

As illustrated in FIG. 2, the power gate 68 supplying copy C0 of the control signal is connected to supply copy C0 to enabling gates 56 and 61 over lines 91 and 92, respectively, where B0 enabled by enabling gate 56 is in a separate parity checked group from B4 enabled by enabling gate 61.

Likewise, power gate 69 supplies copy C1 of the control signal to enabling gates 58 and 63 over lines 93 and 94, respectively. Power gate 70 supplies copy C2 of the control signal to enabling gates 60 and 65 over lines 95 and 96, respectively. Power gate 71 supplies copy C3 of the control signal to enabling gates 57 and 62 over lines 97 and 98, respectively. Power gate 72 supplies copy C4 of the control signal to enabling gates 59 and 64 over lines 99 and 100, respectively. In sum, the means 67 operates to generate plural copies of the control signal CTL supplied on line 66, where at least one of the plural copies is connected to supply a copy of the control signal CTL to enabling gates that enable bits in more than one of the parity check groups in the field 51.

As mentioned above, the output of the enabling means 54 enables the output data path 55 to supply the field 51 of data bits B0-B7 and parity bits P0, P1 for communication to another location in a data processing machine.

The data path 50 is parity checked by parity checkers including a parity checker PC0 73 for the first field 52 and a parity checker PC1 74 for the second field.

FIG. 3 illustrates an embodiment of the parity checker, for example PC0 for implementation in FIG. 2. As can be seen, parity checker PC0 is connected to receive bits B0-B3 on lines 75 from the data path 55.

Likewise, the parity bit P0 is supplied on line 76. The parity checker PC0 includes a first exclusive OR gate 77 receiving as inputs bits B2 and B3 and connected at its output as one input to a second exclusive OR gate 78. A third exclusive OR gate 79 receives bits B0 and B1 as inputs and supplies its output as the second input to the second exclusive OR gate 78. The output of the second exclusive OR gate 78 indicates a parity of bits B0-B3 as supplied on line 75, designated the check parity CP0. The check parity CP0 is supplied as one input to exclusive OR gate 80. The second input to exclusive OR gate 80 is the parity bit P0 supplied on line 76. If the check parity CP0 and P0 match, then the output of exclusive OR gate 80 is zero. If the check parity CP0 and parity P0 do not match, then the output of exclusive OR gate 80 is one and indicates the occurrence of a parity error. The implementation of parity checker 74 for bits B4-B7 and parity bit P1 is identical and not described again. Various equivalent parity checking circuits are known in the art.

By a coupling means 90, as illustrated in FIG. 2, the probability that a damaging error due to a failure of one of the power gates 68-72 in the output supplied on the data path 55 goes undetected is reduced to zero when, as in FIG. 2, each power gate supplies a copy of the control signal to more than one enabling gate, but only one enabling gate per error checked group. The present invention provides enhancement of the ability to detect damaging errors in the control line copies of a parity checked data path even for systems having an arbitrary number of copies of the control signal, each copy spread across an arbitrary number of bits belonging to an arbitrary number, greater than one, of parity checked groups.

The present invention has been described with reference to a specific embodiment for the purposes of illustration. It will be appreciated by those skilled in the art that many variations and modifications in the embodiment shown can be made that fall within the spirit of the invention. It is indended that the scope of the invention be defined by the claims appended hereto.

I claim:

1. In a data processing apparatus providing a data field having more than one error checked group of information units, the respective groups including data and error codes for identifying errors in the data of the respective group, and having a data path including a plurality of parallel data lines, one data line for each information unit in the data field, and for each respective error checked group, means connected to data lines in the data path corresponding to the respective group and responsive to the data and error code of the respective group for detecting errors in the respective group, an apparatus responsive to a control signal for supplying the data field to the data path comprising:

means for generating plural copies of the control signal;

for each data line, an enabling means receiving one of the information units from a group of the data field at one input and one of the plural copies of the control signal at another input, for supplying the one information unit to the corresponding data line; and means for coupling at least one of the plural copies of the control signal, respectively, to one enabling gate for supplying an information unit from one of the error checked groups to the corresponding data line and to another enabling gate for supplying an information unit from another of the error checked groups to the corresponding data line, whereby an error in one copy of the control signal affects information units supplied to the data path from more than one error checked group.

2. The apparatus of claim 1, wherein said information units are binary bits and the error code is a parity bit over the data of the respective group.

3. The apparatus of claim 2, wherein each of the copies of the control signal is coupled to only one enabling gate per error checked group.

4. In a data processing apparatus providing a data field having more than one error checked group of bits, the respective groups including data and parity bits for identifying errors in the data of the respective group, and having a data path including a plurality of parallel data lines, one data line for each bit in the data field, and for each respective error checked group, means connected to data lines in the data path corresponding to the respective group and responsive to the data and parity bits of the respective group for detecting errors in the respective group, an apparatus responsive to a control signal for supplying the data field to the data path comprising:

means for generating plural copies of the control signal;

for each data line, an enabling means receiving one of the bits from a group of the data field at one input and one of the plural copies of the control signal at another input, for supplying the one bit to the corresponding data line; and means for coupling each of the plural copies of the control signal, respectively, to one enabling gate for supplying a bit from one of the error checked groups to the corresponding data line and to another enabling gate for supplying a bit from another of the error checked groups, whereby an error in one copy of the control signal affects bits supplied to the data path from more than one error checked group.

* * * * *